INVENTORS
EDWARD W. MEHAL
DON W. SHAW

United States Patent Office 3,425,879
Patented Feb. 4, 1969

3,425,879

METHOD OF MAKING SHAPED EPITAXIAL DEPOSITS

Don W. Shaw, Garland, and Edward W. Mehal, Dallas, Tex., assignors to Texas Instruments Incorporated, Dallas, Tex., a corporation of Delaware Filed Oct. 24, 1965, Ser. No. 504,977
U.S. Cl. 148—175 9 Claims
Int. Cl. H01l 7/36

ABSTRACT OF THE DISCLOSURE

This specification discloses a method of effecting desired growth of semiconductor material on a substrate characterized by effecting a crystallographic orientation on the substrate underneath a suitable mask, and epitaxially depositing semiconductor material to take advantage of the fast-growing crystallographic orientation to deposit semiconductor material in a desired form, while simultaneously effecting extremely slow growth rates on undesired and slow-growing crystallographic planes. Specifically, semi-insulating substrates can be employed; pockets formed therein; and isolated regions of semiconductor material having properties desirable for effecting semiconductor components can be deposited, or grown, therein and achieve coplanarity between the deposited semiconductor material and the substrate with minimal process control. The reason minimal process control is necessary is because the pocket into which the semiconductor material is deposited will expose only the slow-growing planes when the pocket has been filled, such that a co-planar facet is effected which effectively terminates growth because of its slow rate of further deposition. Other specific embodiments disclose the embedment of dielectric layers and the creation of electrically isolating regions about the deposited semiconductor material to effect excellent properties for formation of semiconductor components within the epitaxially deposited semiconductor material.

This invention relates to a method of forming shaped epitaxial deposits of crystalline semiconductor material. More particularly, it relates to a method of forming epitaxial deposits upon a substrate of semiconductor material, the method utilizing preferred growth planes of the semiconductor substrate to produce various geometrically shaped epitaxial deposits. These geometrically shaped epitaxial deposits may then be used, for example, in the formation of electrically isolated components in an integrated circuit, or for electrical interconnections or "posts" between various layers or levels of integrated circuitry.

In fabricating semiconductor devices, particularly such devces as integrated circuits and the like, monocrystalline semiconductor material is often epitaxially formed on selected portions of a monocrystalline substrate. For example, epitaxially deposited regions may form functional parts of an individual component (as the emitter of a transistor), or they may form regions in which devices are formed (as diffused components into epitaxial layers), or they may be utilized in electrically isolating components in an integrated circuit. The size, shape, composition and crystalline orientation of these epitaxially formed regions will vary, therefore, depending upon the particular function they perform.

Epitaxial growth or formation of crystalline semiconductor material as an extension of the crystalline lattice of the substrate occurs in certain preferred crystallographic directions. In the past, epitaxial growth has generally been performed without regard to the relative rates of growth in these crystallographic directions. It has been found, however, that utilizing the fact that the rate of growth in a preferred direction is frequently so much faster than the rate of growth in other directions, crystalline epitaxial growth can be substantially restricted to growth in a single direction by selection of the appropriate substrate crystallographic orientation.

It is therefore an object of the present invention to provide a method of utilizing a fast growth plane (or planes) of a crystalline substrate and its inherently higher growth rate to form shaped epitaxial deposits of semiconductor material. Another object is to utilize such a method for forming interconnections in integrated circuitry and vertical interconnections between layers of integrated circuitry disposed within a monocrystalline block, and for providing planar surfaces for device fabrication. Another object is to provide a method of electrical isolation of components in an integrated circuit utilizing the principles of this invention.

In accordance with these and other objects, fast growth planes of crystalline semiconductors are utilized as substrate surfaces to selectively form shaped epitaxial deposits. Since the semiconductor material grows relatively faster in particular planes, a fast-growing plane may be exposed and epitaxial material formed thereon. When the exposed plane is the fast growth plane, growth in other directions is relatively slow in comparison to growth in the direction normal to this plane, consequently, epitaxial growth is substantially in one direction. Accordingly, semiconductor material can be regrown into a hole formed in a substrate, and the growth can be made to occur substantially from the side of the hole (lateral growth), resulting in a planar surface. In still another embodiment of the invention, the desired geometrical configuration may be exposed in the fast growth plane, and a pillar or post grown thereon. Since the preferred growth direction is normal to the exposed plane, the post grows only normal to the exposed surface and is limited by the geometrical boundaries of the exposed surface. The geometrical configuration of the exposed surface therefore determines the geometrical configuration of the epitaxial deposit. Accordingly, a shaped window may be cut in a suitable mask to expose a fast-growing surface. When the window is properly shaped, all sides of the post will be parallel to slow-growing planes, thus growth is normal to the exposed surface and little spreading over the mask occurs. Conversely, when a slow-growing plane is exposed through a mask and the sides of the epitaxial deposit are parallel to fast-growing planes, growth normal to the exposed surface is slow. Overgrowth then occurs, the epitaxial deposit spreading laterally over the mask relatively rapidly in the direction normal to the fast growth planes. Also, semiconductor material can be regrown into a hole formed in a substrate by lateral growth from the side of the hole to embed a foreign material, for example, silicon oxide.

The novel features believed characteristic of this invention are set forth in the appended claims. The invention itself, however, as well as other objects, features, and advantages thereof, may best be understood by reference to the following detailed description of illustrative embodiments taken in conjunction with the accompanying drawings, wherein:

Figures 1, 2, 3, 4:
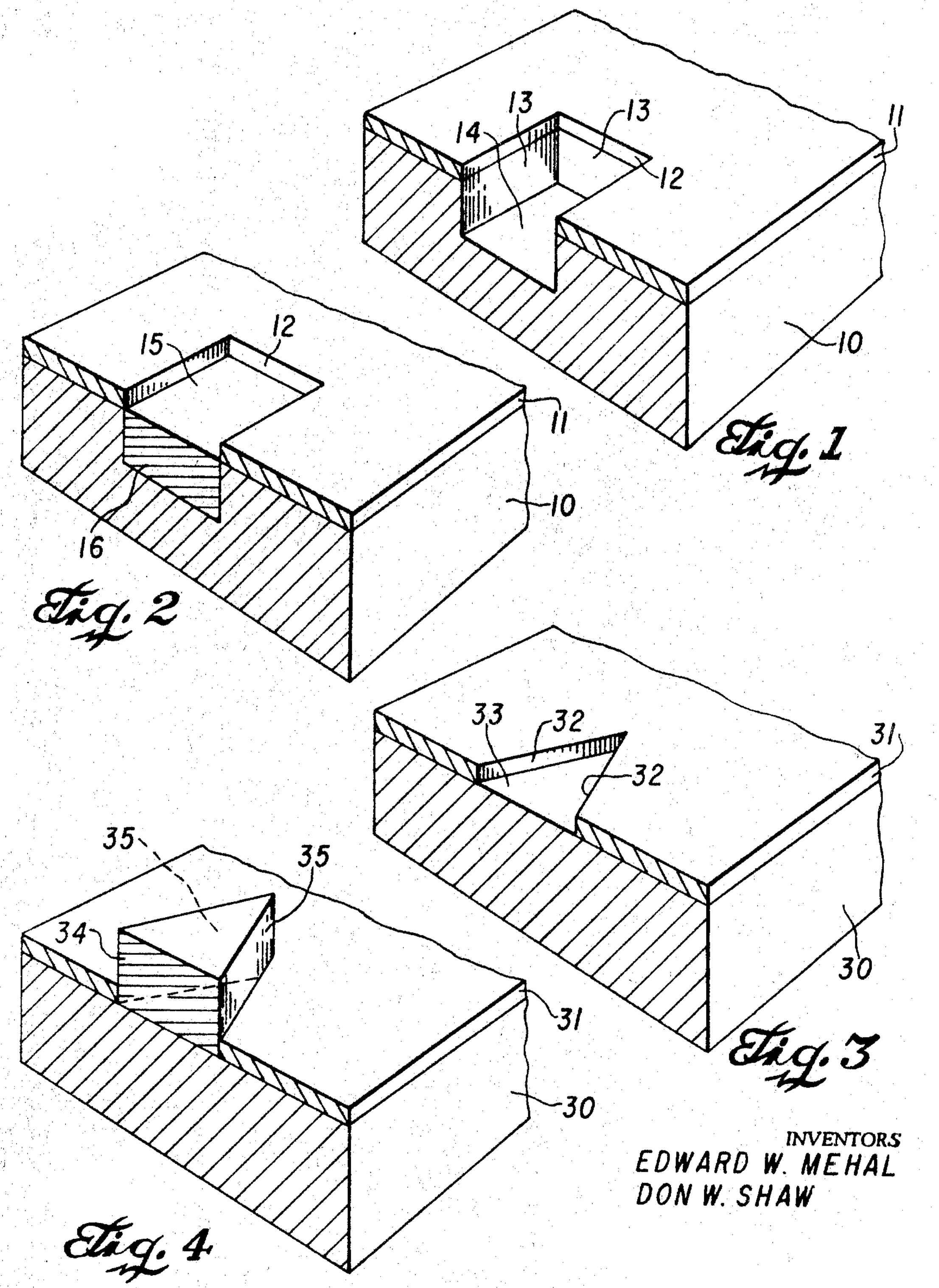
FIGURE 1 is a perspective view partially in section of a semiconductor wafer with a recess formed in one surface thereof.
FIGURE 2 is a perspective view partially in section of the wafer of FIGURE 1 with the recess filled in accordance with the invention.
FIGURE 3 is a perspective view partially in section of a semiconductor wafer with a mask on one surface thereof having a window therein.
FIGURE 4 is a perspective view partially in section of the wafer of FIGURE 3 with a shaped deposit formed in the window.

The drawings are not necessarily to scale as dimensions of certain parts as shown in the drawings have been modified and/or exaggerated for the purpose of clarity of illustration.

The rate of formation of epitaxial deposits of Group IIIA–VA semiconductors on Group IIIA–VA substrates as well as Group IV semiconductors or Group IV substrates, is dependent upon the crystallographic plane of the substrate surface upon which epitaxial growth takes place. For example, the rate of epitaxial growth on a {100} gallium arsenide surface is about 2 to 5 times as fast as the rate of growth on a {111} B surface under certain vapor deposition conditions.

When epitaxial growth is restricted to a semiconductor substrate surface which is exposed in the {100} plane, the epitaxial deposit is formed as a crystalline extension of the lattice of the substrate, and growth is substantially in the [100] direction (normal to the {100} plane.) This selective growth results from the formation of crystalline facets parallel to slow-growing planes which have a high degree of crystal perfection and planarity. Since nucleation sites are relatively unavailable on the facets, epitaxial growth thereon is very slow.

One embodiment of the invention is shown in FIGURES 1 and 2. In FIGURE 1 a crystalline semiconductor substrate 10 is shown. The substrate may be of any suitable crystalline semiconductor material with known fast and slow growing planes such as monocrystalline semi-insulating gallium arsenide. The surface of the substrate 10 is covered with a suitable protective mask 11, as silicon oxide, having a window 12 therein. The substrate is oriented so that the surface exposed through the window is parallel to the {111} plane. The exposed surface is etched to produce a hole having sides 13 parallel to the {100} plane and a bottom parallel to the {111} plane.

The hole in the substrate of FIGURE 1 is then refilled with semiconductor material 16 as shown in FIGURE 2. The semiconductor material 16 may be formed by any suitable vapor phase epitaxial deposition process such as that described by Finch and Mehal, "Preparation of $GaAs_xP_{1-x}$ by Vapor Phase Reaction," Journal of the Electrochemical Society, vol. 111, No. 7, July 1964. Since the hole is bounded by 100 surfaces on the sides and a 111 surface on the bottom, and since the 100 surface is the fast growing plane as compared to the 111 surface, growth of the epitaxial deposit 16 occurs substantially from the sides of the hole. The deposit 16, therefore, is formed by epitaxial extension of the crystalline lattice of the substrate laterally from the sides of the hole almost entirely in the direction normal to the 100 surface. The surface 15 of the deposit 16 is parallel to the 111 plane. The surface deposit thus formed is co-planar and coextensive with the substrate surface and has a smooth surface which is suitable for the fabrication of semiconductor devices. In like manner, growth may be made to occur on the bottom of the hole rather than the sides by orienting the substrate so that the sides of the hole are parallel to the 111 plane, and the bottom of the hole parallel to the 100 plane.

Another embodiment of the invention is shown in FIGURES 3 and 4. Referring to FIGURE 3, a semiconductor substrate 30 is shown with a suitable masking material 31, as silicon oxide, thereon. A portion of the masking material 31 is removed leaving a window 32 which exposes a selected portion of the surface 33 of wafer 30. Wafer 30 is suitably crystallographically oriented so that surface 33 is the fast growth plane of the substrate 30 as described above. An epitaxial deposit of semiconductor material on the exposed surface 33 takes the geometrical configuration of the window 32. The shape of the window is such that the sides of the deposit formed will be parallel to slow-growing planes. Since the preferred growth direction is normal to the plane exposed through window 32, the epitaxial deposit forms a column or pillar extending upwardly from the substrate 30, as shown in FIGURE 4. Furthermore, since the sides of the column, or post, are all parallel to slow-growing planes, the deposit can be extended vertically without spreading over the mask. This column or post of semiconductor material may advantageously be used as a vertical interconnection between two layers of semiconducting material in a monocrystalline block wherein two horizontal layers of material are separated by and contiguous with a layer of semi-insulating material.

In a typical example, wafer 30 may be an N-type wafer of gallium arsenide with a silicon oxide mask 31 thereon. The surface 33 is parallel to the {110} and the window 32 is diamond-shaped. The epitaxial deposit 34 grows vertically in the direction normal to the {110} plane. By proper orientation of the diamond-shaped window with respect to the substrate, the sides 35 of the deposit are parallel to {111} planes, thus a diamond-shaped column or post 34 is formed. After the vertical post 34 is formed as described above, the silicon oxide layer 31 may be removed and semi-insulating gallium arsenide formed on the exposed surface of wafer 30 and surrounding the vertical post 34. Thereafter a second layer of N-type gallium arsenide may be deposited over the surface of the semi-insulating layer (not shown) and in contact with the top surface of vertical interconnecting post 34. Thus, the second epitaxial layer of N-type gallium arsenide may advantageously be electrically interconnected with the substrate 30 by way of vertical interconnection 34, while the two N-type layers are separated by, but contiguous with, an intermediate layer of semi-insulating gallium arsenide.

It is to be understood that although the shaped epitaxial deposit 34 has been described as a vertical interconnection post, the method described could also be used to form larger epitaxial deposits. For example, by using a semi-insulating material such as semi-insulating gallium arsenide as the substrate 30, a plurality of shaped epitaxial deposits 34 may be formed thereon to produce a monolithic semiconnductor block with electrically isolated regions of semiconductor material thereon suitable for making various integrated or hybrid circuits.

In accordance with another aspect of the invention, a hole or pocket may be formed in a substrate or material of one composition, a portion of the hole selectively covered with a foreign material of another composition, and the hole or pocket refilled by epitaxially growing from the exposed portions of the hole the same material of the substrate, to bury the foreign material within the pocket. For example, the material of the substrate may be monocrystalline gallium arsenide, and the foreign material may be metal, oxide, or even another type of semiconductor material as silicon or germanium.

Such a process may be utilized in fabricating an integrated circuit utilizing a dielectric as the primary means for electrically isolating the components from one another. Accordingly, pockets or holes are selectively etched in a substrate of monocrystalline semiconductor material, a layer of dielectric (insulating) material is then selectively located at the base of each of the pockets, a wall (or the walls) of the pocket remaining exposed monocrystalline material. Single crystal semiconductor material of desired conductivity and impurity concentration is then epitaxially grown within the pockets over the layer of dielectric material, the epitaxial growth proceeding from the exposed walls of the pockets. The redeposited regions of semiconductor material are then electrically isolated at their base by the dielectric material. Isolation of the remaining portion of the redeposited regions (the portion adjacent the exposed walls) is then achieved by ring diffusion or etching, for example. Since the bottom of the pockets or holes (the dielectric isolated portion) generally has a much greater area than the walls, this isolation technique results in a substantially lower capacitance than utilizing P-N junction isolation of the entire region. The individual circuit components are then formed within each of the redeposited regions by suitable integrated circuit methods.

Figure 5:
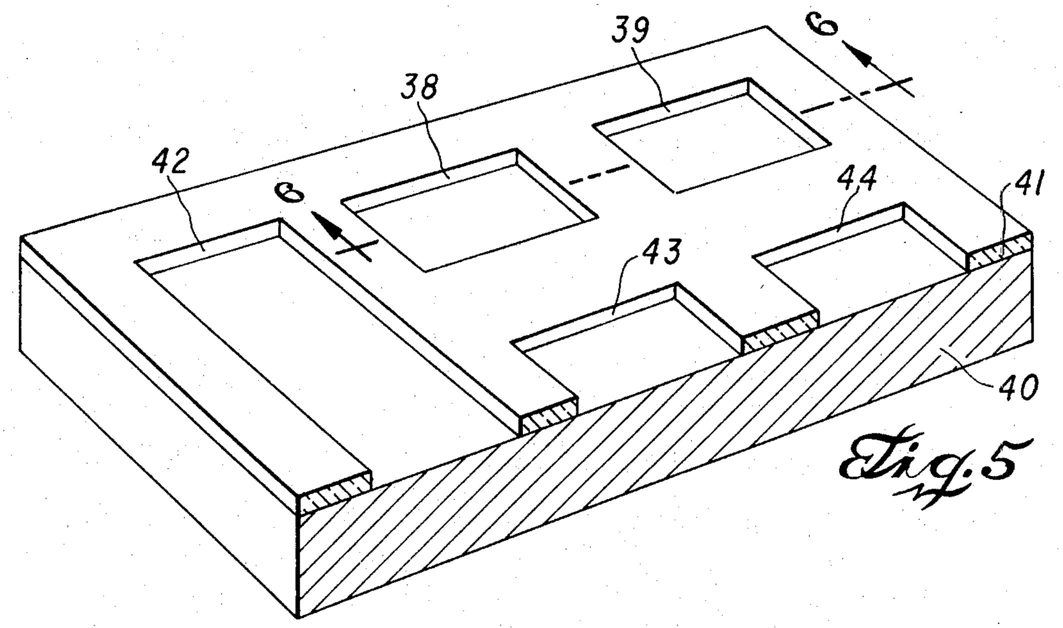
FIGURES 5–8 are pictorial views in section of the initial steps in the fabrication of another embodiment of the present invention.

Referring now to FIGURE 5, there is described the first step in this method. A slice of single crystal semiconductor material, in this example silicon, is used as the starting material. This slice may be about one inch in diameter and ten mils thick. A small segment of the slice may be represented as a chip or wafer 40, which represents the segment occupied by one integrated circuit. Actually, the slice would contain dozens or even hundreds of the segments such as the wafer 40.

An oxide layer 41 is then formed upon the upper surface of the wafer 40, as depicted in FIGURE 5. The oxide layer, which might be silicon oxide for example, should preferably be of a thickness in excess of 10,000 A., and may be formed by any conventional technique. For example it may be thermally grown by heating the entire structure to a temperature of approximately 1300° C. in the presence of oxygen.

An alternative method of forming the silicon oxide layer 41, and one which may particularly be used when the semiconductor material is other than silicon, involves a technique of deposition rather than the thermal growth described. Accordingly, oxygen and tetraethoxysilane are reacted in vapor form at 250–500° C. in the presence of the semiconductor wafer 40. The reaction mixture is obtained by bubbling oxygen through liquid tetraethoxysilane at room temperature, then combining the gaseous mixture with excess oxygen and passing it into a furnace tube containing the wafer 40 where the oxidation takes place. The silicon oxide thereby produced is deposited upon the upper surface of wafer 40. Typical reaction conditions for such a process involves, by way of example, a flow rate of one cubic foot of oxygen per hour into the liquid tetraethoxysilane and a combination of the gaseous mixture with the oxygen also at a rate of one cubic foot per hour. Passing the combination mixture into a two inch diameter quartz furnace tube at approximately 500° C. results in silicon oxide deposits at rates from 1300–1400 A. per hour upon the surface of the slice 40.

Through the use of conventional photographic masking and etching techniques, select portions 38, 39, 42–44 of the oxide layer 41 are removed so as to expose corresponding portions of the semiconductor wafer 10 within the holes or apertures 38, 39, 42–44. This removal may be accomplished by covering the oxide layer 41 with photoresist, selectively masking, exposing to light, and developing the photoresist, then etching away the unmasked areas of the oxide. By this method, the oxide mask shown in FIGURE 5 is produced directly upon the surface of the wafer 40, and limits the area of the semiconductor substrate that is to be affected by the subsequent etching step.

As the next step in the process of the present invention, the top surface of the masked slice 40 is subjected to a selective etch which removes a given amount of semiconductor material beneath the windows 38, 39, 42–44. This removal may be accomplished by a conventional solution etch, or alternatively, by a conventional vapor etch, the etchant being of a composition which removes the exposed semiconductor material within the windows while substantially unaffecting the oxide mask 41. Consequently "pockets" 52′ and 53′ will be formed within the substrate 40 as shown in FIGURE 6, where the desired amount of semiconductor material has been removed beneath the windows 38 and 39 down to the lines 52 and 53, respectively.

Figure 6:
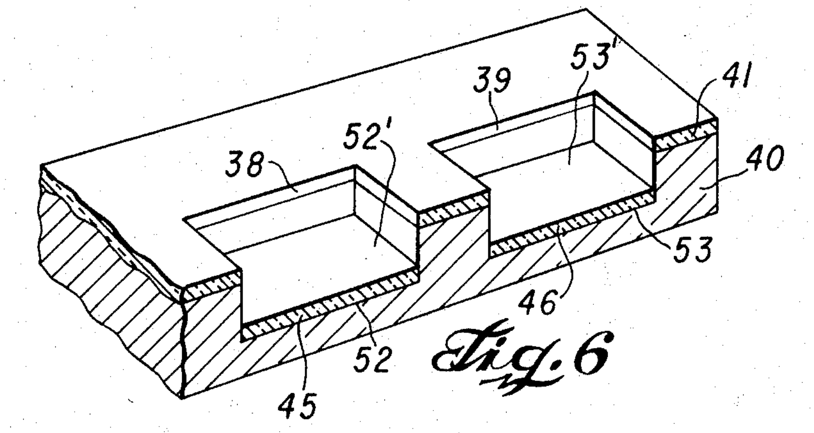
Figure 7:
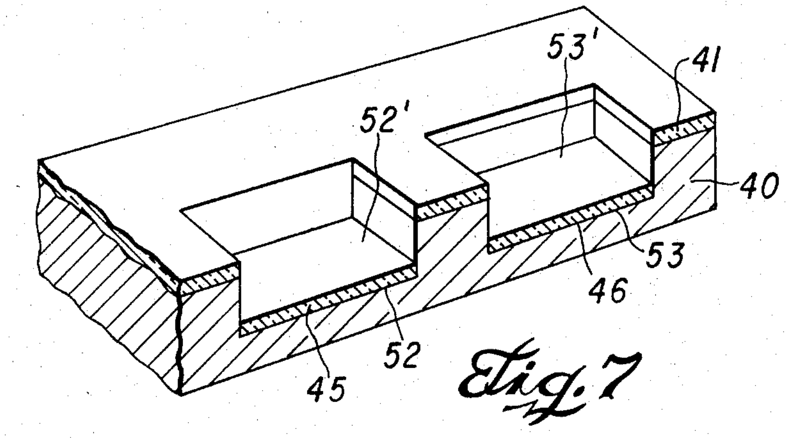

As the next step, silicon oxide layers 45 and 46 are formed within the pockets 52′ and 53′, for example, by any suitable technique, as thermal oxidation or the deposition technique, so as to cover the walls as well as the bottom or base of the pockets, as shown in FIGURE 6. Using conventional photographic masking and etching techniques, thereafter, only the portions of the oxide layers 45 and 46 which cover the walls of the pockets 52′ and 53′ are selectively removed, so that the only oxide that remains within these pockets are the portions of oxide layer 45 and 46 which cover the bottom of the pockets 52′ and 53′, as illustrated in FIGURE 7. As an alternative to growing or depositing oxide upon the walls and bottoms of the pockets, it may be desirable to initially selectively deposit the oxide layers 45 and 46 solely on the bottom of the pockets.

Figure 8:
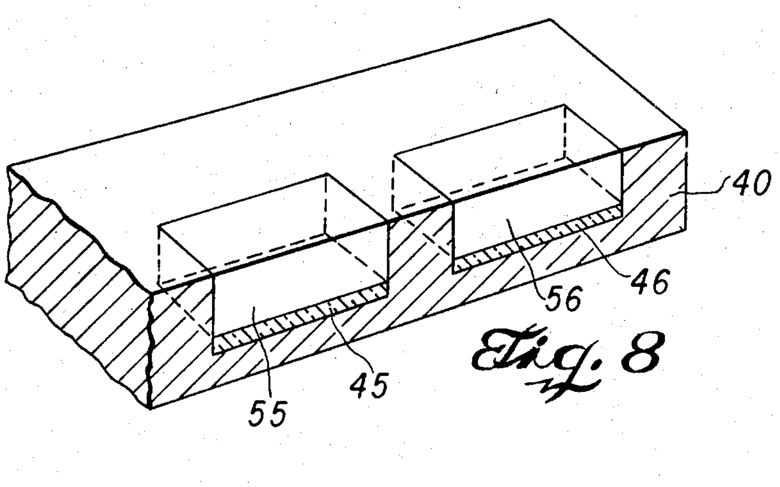

There is then selectively epitaxially redeposited through the oxide mask 41 regions 55 and 56, FIGURE 8, of single-crystal semiconducting material wihin the pockets 52′ and 53′. Due to the fact that the single crystalline walls of the holes or pockets 52′ and 53′ remain exposed, single crystalline silicon will deposit within the holes even though silicon oxide is present on the bottom of the holes, the epitaxial growth proceeding from the walls and growing inward, laterally over the oxide layers 45 and 46. The resulting structure is seen in FIGURE 8 after the oxide mask 41 has been stripped from the face of the slice 40. The bases of the semiconductor regions 55 and 56 are electrically isolated from the semiconductor material of the slice 40 by the silicon oxide layer 45 and 46 respectively.

In practicing the invention, various arrangements may be utilized as well as various techniques applied in order to accomplish the steps of selective etching and epitaxially redepositing within the unmasked regions. There is presently described a process, however, whereby the wafer 40 is placed within a reactor where the pockets 52′ and 53′, for example, are formed by vapor etching, and the epitaxial redeposition is achieved with substantially the same constituents as those used for the selective vapor etch. The basic formula for this operation is $$SiCl_4+2H_2=4HCl+Si$$

This reaction is forced to the left by the addition of an excess of HCl, thus creating an etching condition. To change from an etching condition to one of deposition (i.e., when the reaction proceeds to the right) merely calls for the termination of the HCl flow which, in turn, brings about a gradual change from an etching condition to one of deposition.

Figure 9:
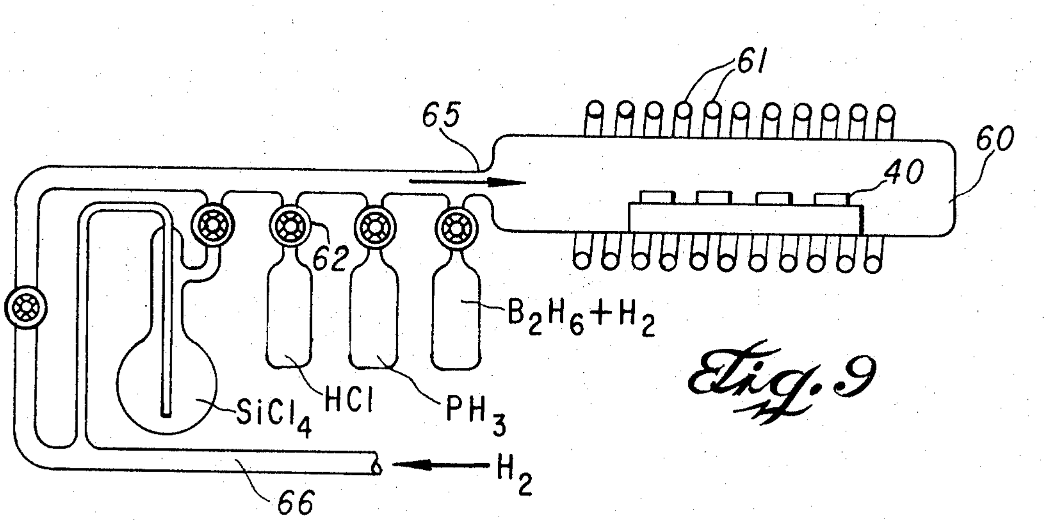
FIGURE 9 is a schematic representation of one form of apparatus utilized in the fabrication of the embodiment described with reference to FIGURES 5–8.

Referring to FIGURE 9, apparatus for etching and redepositing in accordance with this process comprises a reactor in the form of a tube furnace 60 having heating coils 61. The furnace may be of a horizontal or vertical type, may be suited for single or multiple slices, and may be either resistively or inductively heated. The silicon wafers 40 having the oxide masks 41 upon their surfaces, are disposed within the furnace in such a position as to be exposed to gases directed into the tube furnace through a conduit 65. The hydrogen chloride vapor is introduced into the conduit 65 from a cylinder containing anhydrous HCl. The silicon tetrachloride vapor is introduced into the conduit 65 by bubbling purified dried hydrogen ($H_2$) through liquid silicon tetrachloride ($SiCl_4$) contained in a flask as shown. The purified dried hydrogen enters an end 66 of the conduit. The flow of the gases into the tube furnace 60 is regulated by conventional valves.

With the valves adjusted so that an excess of hydogen chloride vapor is introduced into the reactor, the wafers 40 are subjected to a selective vapor etch resulting in the structure shown in FIGURE 6. While the oxide mask 41 is substantially unaffected, select portions of the substrate 40 below the oxide aperatures 38 and 39 are removed in the manner shown to provide the pockets 52' and 53'. The etchant itself comprises a mixture of silicon tetrachchloride, hydrogen chloride, and hydrogen. Alternatively, the valve controlling the flow of silicon tetrachloride may be closed, and an etchant comprising hydrogen chloride and hydrogen may successfully be used to remove the silicon substrate.

The rate of etching as well as the dimensions of the etched regions will largely by determined by the configuration and size of the oxide masking 41, the temperature at which the reactor is maintained, the flow rate through the conduit 65 and the percentage composition of the etchant. For example for one particular configuration of the oxide mask 41, when the flow rate is kept at 30 liters/minute, the temperature at approximately 1200° C., and the etchant consists of 95% $H_2$ and 5% HCl, the silicon substrate 40 etches at a rate of approximately 0.22 micron/second.

After the desired amount of the silicon substrate has been removed by the above-described process, the slice 40 is removed from the reactor and the oxide layers 45 and 46 are selectively formed at the bottoms of the etched holes 52' and 53', as previously described, resulting in the structure shown in FIGURE 7. The slices 40 are then placed back in the reactor tube 60 for the epitaxial redeposition step.

The value 62 shown in FIGURE 9 is closed to terminate the flow of the hydrogen chloride, the gas flow through the conduit 65 now consisting of hydrogen and silicon tetrachloride. Doping is accomplished by introducing an appropriate impurity-containing compound such as phosphene ($PH_3$) for N-type doping, or diborane ($B_2H_6$) for P-type doping. These compounds are stored in cylinders filled with hydrogen as a carrier gas as shown in FIGURE 9 and are interjected in the main gas stream by adjusting the appropriate valves. With this arrangement, and due to the hydrogen reduction of the silicon tetrachloride, N-type or P-type silicon of the desired impurity concentration is grown upon the exposed walls within the pockets or holes 52' and 53'. The growth begins upon the walls and extends inward to completely fill the holes with single crystalline silicon semiconductor material, the silicon oxide layers 45 and 46 electrically isolating the base of the deposited regions 55 and 56 from the substrate material of the slice 40.

Since the deposition of single crystalline material within the holes 52' and 53' depends upon epitaxial growth substantially (or solely) upon the walls of the holes or pockets, steps should be taken to avoid any type of growth upon the oxide layers 45 and 46 on the bottoms of the holes. This ordinarily is not a problem when semiconductor material other than silicon is epitaxially grown within the holes, and the layers 45 and 46 are of silicon oxide. When the semiconductor material is silicon, however, various steps should be taken to avoid any nucleation and growth upon the oxide layers. Some of these precautionary steps are: using a process of oxide deposition that results in a substantially pin-hole free oxide layer, cleaning the surfaces of the oxide layers completely before epitaxial redeposition, maintaining as large a silicon to silicon oxide ratio as possible, using depressing agents such as HCl to retard nucleation upon the oxide, and maintenance of reactor conditions (for example, low temperatures of deposition) to avoid spurious growths upon the oxide.

Figure 10:
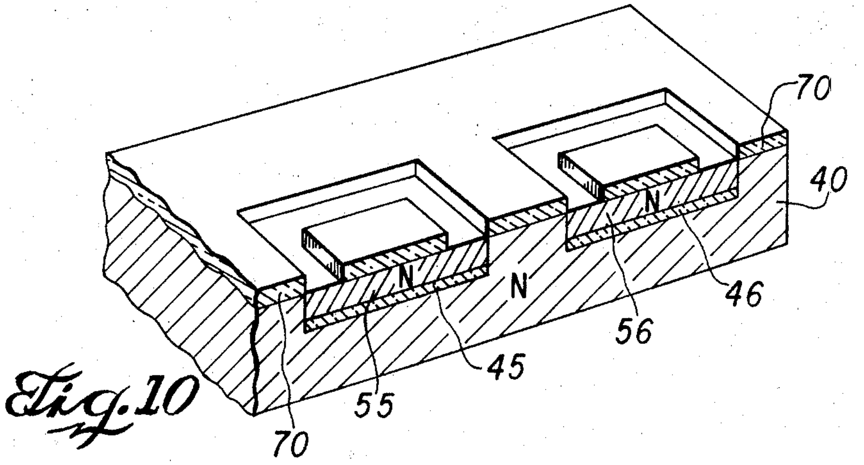
FIGURES 10–13 are sectional views of alternative steps in the fabrication of isolated integrated circuits according to the process of the invention.
Figures 11, 12:
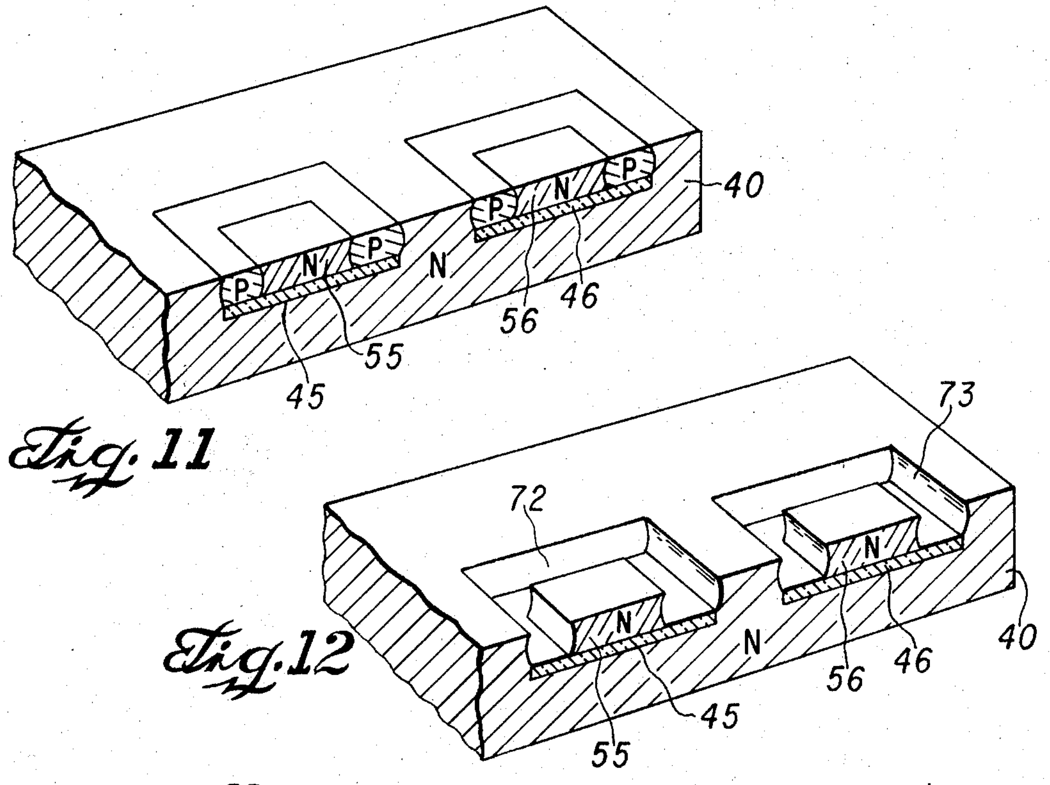

Utilizing the above described process, various configurations embodiments may be produced. For example, as shown in FIGURE 10, the starting material of the slice 40 is high resistivity N-type semiconducting material, and the epitaxially redposited regions 55 and 56 are also of N-type semiconducting material. The oxide layers 45 and 46 provide partial electrical isolation in the vertical direction from the substrate material 40. To achieve complete isolation in the horizontal direction, a diffusion mask 70 is formed upon the surface of the slice as shown, and P-type material is diffused to isolate the N-type material of the substrate from the side walls of the N-type regions 55 and 56, respectively as shown in FIGURE 11. Although P-N junction isolation is thereby used, in part, to compelte the isolation, the primary isolation is achieved by the silicon oxide dielectric layers. Since the width of the regions 55 and 56 are ordinarily substantially greater than the depth of these regions [the ratio being 20 to 1 or considerably larger (as high as 100 to 1)], this method results in a considerably lower capacitance than using a technique that completely isolates the regions with P-N junctions. (It is to be pointed out that the drawings are not to scale.)

As an alternative to diffusing P-type material to complete the isolation, channels or moats 72 and 73 may be selectively etched to isolate the walls of the regions 55 and 56 from the substrate, as depicted on FIGURE 12. This selective etch may be carried out immediately after the epitaxial redeposition, or alternatively, may be carried out after the formation of the circuit component and interconnection according to the process described in copending U.S. Patent application, Ser. No. 468,196, filed June 30, 1965, and assigned to the assignee of the present invention.

Figure 13A:
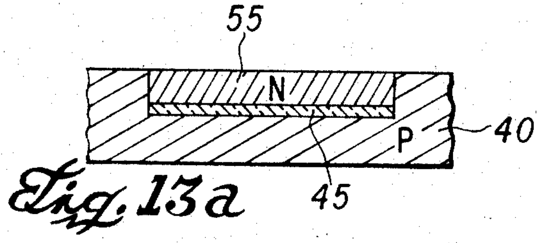
Figure 13B:
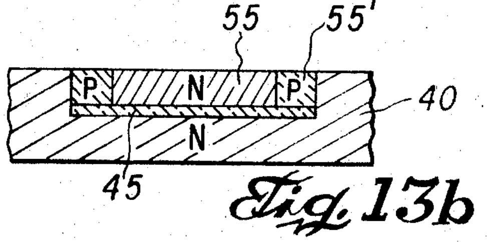

As an alterantive to epitaxially redepositing same conductivity type material within the etched pockets, and then diffusing (as shown in FIGURE 11) or etching (as shown in FIGURE 12) to complete the isolation, the semiconductor material that is epitaxially redeposited within the etched pockets may be of opposite type conductivity from the starting material of the slice. For example, as shown in FIGURE 13*a*, the material of the slice or wafer 40 is P-type semiconductor material, and the redeposited regions 55 and 56 are of N-type conductivity. The isolation of the bases of these regions is then achieved by the silicon oxide layers 45 and 46, and the remaining isolation of the walls of the regions 55 and 56 is achieved by the junctions intermediate these regions and the substrate 40. The depth of the layers 55 and 56 may be approximately 0.5 mil, and the thickness of the oxide layers 45 and 46 may be approximately 5000 A. Alternatively, as illustrated in FIGURE 13*b*, the wafer 40 may be N-type, then upon the beginning of the redeposition of region 55' of P-type material grown, then the remainder of the region 55 N-type.

Figures 14, 15:
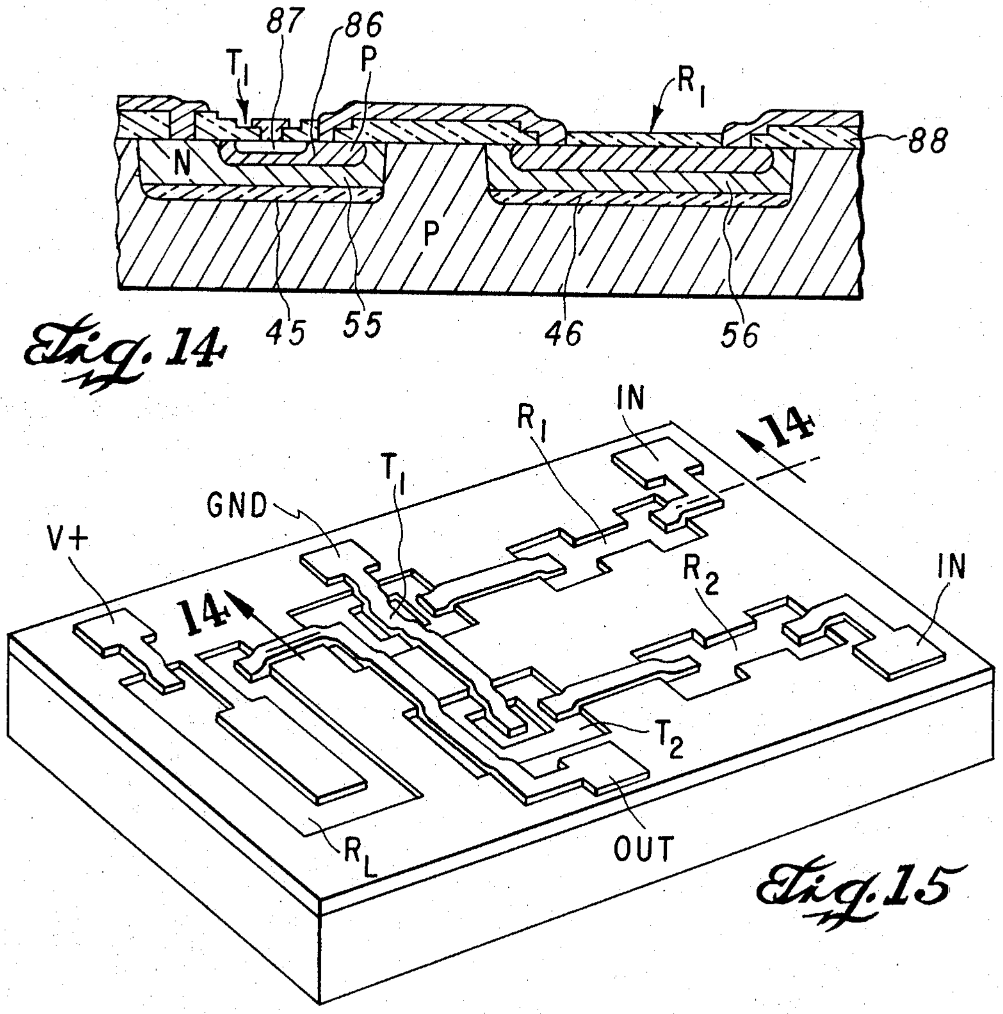
FIGURE 14 shows the fabrication of circuit components in isolated semiconductor regions, the components being part of an integrated circuit.
FIGURE 15 is an isometric pictorial view of a completed integrated circuit.
Figure 16:
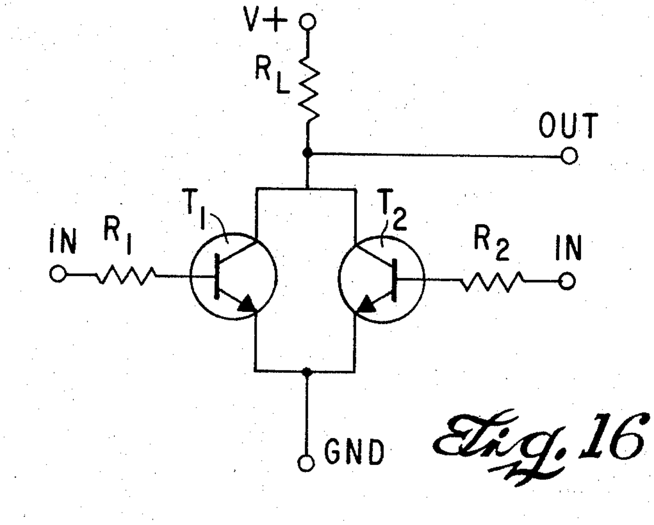
FIGURE 16 is a schematic diagram of the integrated circuit contained within the device of FIGURE 15.

The layers 55 and 56 now serve as regions into which subsequent diffusions, or upon which epitaxial depositions, may be made in order to fabricate various components of an integrated circuit. Referring now to FIGURE 14, a sectional view of a portion of a completed integrated circuit is seen, with an NPN transistor $T_1$ and a risistor $R_1$ having been formed in the N-type redeposited regions 55 and 56 by diffusion. A P-type diffused region 86 provides the base of the transistor $T_1$, and a P-type region formed simultaneously with the base provides the resistor $R_1$. An N-type diffused region 87 provides the transistor $T_1$ emitter. The diffusion operations utilize silicon oxide masking so that the oxide layer 88 acquires a stepped configuration in the final device. Openings are made in the oxide where contact is necessary, then a metal film is deposited over the oxide and selectively removed to provide the desired contacts and interconnections. One completed unit is seen in FIGURE 15, with the transistor $T_1$ and $T_2$ and the resistors $R_1$, $R_2$, and $R_3$ along with the metal film interconnections providing a logic circuit as seen in schematic form in FIGURE 16.

Although the process has been described whereby pockets or holes are formed in the semiconductor substrate, and insulating material selectively located at the bottom of the holes, leaving the four walls of the pocket exposed for epitaxial growth, it is only necessary that one wall or even a portion of the wall be exposed in order for the epitaxial growth to completely "fill up" the pockets by lateral growth. In the case where the three walls are covered in addition to the bottom of the pockets, the diffusion step or etching step described with reference to FIGURES 10–12 in order to complete the isolation of the semiconductor material with the pockets, will then only be directed to the fourth (exposed) wall. This would be particularly useful when employing the isolation scheme of FIGURE 12 where moats 72 and 73 are etched to complete the isolation of the regions 55 and 56 from the substrate. These moats are discontinuities over which deposited metal leads cannot be extended. Thus, if only one or two walls in each hole were uncovered in each pocket then the moats need not extend all the way around the pocket and a plane area will be left free for metal film interconnections.

In addition, although the description of the etched pockets or holes has been referenced to "four walls," the pockets may be of any shape, as hexagons, cylinders, etc., with a portion or portions of the side walls of the pockets exposed to promote epitaxial growth. The insulation layers 45 and 46 although referred to as silicon oxide (dioxide), may also be of carbon rich silicon carbide, alumina or any other suitable insulating material.

Various alterations may be affected in the actual fabrication of the integrated circuit. For example, regions of low resistivity material may be diffused at the ohmic contact points before the application of the metallic contacts and interconnection in order to lower the contact resistance. It may also be desirable to epitaxially grow low resistivity semiconductor material within the pockets initially, followed by an etch and refill of high resistivity material over the low resistivity material in order to lower the collector spreading resistance of the transistors. Additionally, although silicon and gallium arsenide material have been specifically referred to, the processes of this invention are equally applicable to germanium, II–VI compounds, or other types of semiconductor material.

Various other modifications may become apparent to persons skilled in the art without departing from the spirit and scope of the invention as defined by the appended claims.

What is claimed is:

1. The method of forming a semiconductor deposit in a recess in a crystalline substrate, the surfaces of said deposit and said substrate being co-planar, comprising the steps of:

(a) forming a mask on a surface of said substrate, said surface being parallel to a slow-growing crystallographic plane in said crystalline substrate;

(b) removing a portion of said mask, thereby exposing a portion of said surface;

(c) removing a predetermined amount of the substrate exposed through said mask, thereby forming a recess in said substrate, the exposed surface in said recess having a slow-growing orientation forming the bottom and fast-growing surfaces forming the sides of said recess; and (d) epitaxially depositing semiconductor material on said fast-growing surfaces forming the sides of said recess;

whereby, when said recess is filled, a smooth surface facet exposing only the slow-growing crystallographic plane is effected and further growth effectively terminated due to the slow growth rate of the facet.

2. In a method of fabricating an integrated circuit, the steps of:

(a) forming a plurality of pockets within a substrate of single crystalline semiconductor material;

(b) selectively covering the base of each said pockets with a dielectric insulating layer, at least one wall of each of said pockets remaining exposed single crystalline semiconductor material, said at least one wall having a fast-growing crystallographic orientation;

(c) epitaxially depositing single crystalline semiconductor regions on said at least one wall to embed said dielectric layer; and (d) effecting an isolation region at least one wall, whereby said epitaxially deposited material is electrically isolated from said substrate by said dielectric insulating layer and said isolating region at said at least one wall.

3. The method as described in claim 2 including the step of forming individual circuit components within each said epitaxially deposited single crystalline regions.

4. The method as described in claim 6 including the step of selectively diffusing impurities of opposite conductivity type than the conductivity type of said epitaxially deposited regions, to electrically isolate said deposited regions from said substrate at the said at least one wall.

5. The method as described in claim 2 wherein said isolation region is formed by the step of selectively etching the periphery of said epitaxially deposited regions to electrically isolate said deposited regions from said substrate at said at least one wall.

6. The method of claim 2, wherein said isolation region is formed by creating at least one junction between regions of opposite conductivity types at said at least one wall.

7. In a method of fabricating an integrated circuit, the steps of:

(a) forming a pluarity of pockets within a substrate of one conductivity type single crystalline semiconductor material;

(b) selectively covering the base of each said pockets with a dielectric insulating layer, at least one wall of each of said pockets remaining exposed single crystalline semiconductor material, said base of each of said pockets having a slow-growing crystallographic orientation and said at least one wall of each of said pockets having a fast-growing crystallographic orientation;

(c) epitaxially depositing single crystalline semiconductor regions first of one conductivity type and then of an opposite conductivity type from said at least one wall to embed said dielectric layer; and (d) electrically isolating said epitaxially deposited single crystalline semiconductor regions from said single crystalline semiconductor substrate.

8. The method of claim 7, wherein said step of electrically isolating said epitaxially deposited single crystalline semiconductor regions is effected by the step of selectively diffusing impurities of opposite conductivity type than the conductivity type of said epitaxially deposited regions adjacent said at least one wall of each of said pockets effecting about each of said epitaxially deposited regions a P-N junction from the surface to said dielectric insulating layer.

9. The method of claim 7, wherein said step of electrically isolating said epitaxially deposited single crystalline semiconductor regions is effected by selectively etching the periphery of said epitaxially deposited regions at said at least one wall of each of said pockets from the surface to said dielectric insulating layer.

References Cited

UNITED STATES PATENTS

| | | | |
|---|---|---|---|
| 3,000,768 | 9/1961 | Marinace | 148—175 |
| 3,156,591 | 11/1964 | Hale et al. | 148—175 |
| 3,206,339 | 9/1965 | Thornton | 148—174 XR |
| 3,236,701 | 2/1966 | Lin | 148—174 XR |
| 3,260,902 | 7/1966 | Porter. | |
| 3,265,542 | 8/1966 | Hirshon | 148—175 |
| 3,296,040 | 1/1967 | Wigton | 148—175 |
| 3,322,581 | 5/1967 | Hendrickson et al. | 148—175 |
| 3,370,995 | 2/1968 | Lowery et al. | 148—175 |
| 3,372,069 | 3/1968 | Bailey et al. | 148—175 |

CHARLES N. LOVELL, *Primary Examiner.*

P. WEINSTEIN, *Assistant Examiner.*

U.S. Cl. X.R.

29—578; 117—106; 148—1.6, 187; 156—17